United States Patent [19]

Uchida et al.

[11] Patent Number: 4,547,132
[45] Date of Patent: Oct. 15, 1985

[54] APPARATUS FOR CONTINUOUSLY TRANSFERRING A SLURRY BY LIQUID PRESSURE

[75] Inventors: Kenji Uchida, Kashiwa; Masakatsu Sakamoto, Matsudo; Makoto Saito, Ibaraki; Yukishige Kamino, Tsuchiura, Japan; Hiroshi Miyadera, Hitachi, all of Japan

[73] Assignee: Hitachi, Ltd., Tokyo, Japan

[21] Appl. No.: 639,007

[22] Filed: Aug. 9, 1984

[30] Foreign Application Priority Data

Sep. 14, 1983 [JP] Japan ................... 58-168178

[51] Int. Cl.[4] .................. F04F 1/10; F04F 1/14
[52] U.S. Cl. ............................. 417/63; 417/102; 417/103; 417/900
[58] Field of Search ................ 417/102, 103, 900, 63

[56] References Cited

U.S. PATENT DOCUMENTS

| 3,907,462 | 9/1975 | Kroeger | 417/102 |
| 4,304,527 | 12/1981 | Jewell et al. | 417/102 |
| 4,321,016 | 3/1982 | Sakamoto et al. | 417/102 X |
| 4,460,318 | 7/1984 | Horton | 417/103 X |

Primary Examiner—Richard E. Gluck
Attorney, Agent, or Firm—Antonelli, Terry & Wands

[57] ABSTRACT

A part of the driving liquid discharged from an outlet pipe for driving liquid is supplied, under the control of a first flow control means, to a slurry tank in accordance with the amount of the solid matter supplied thereto, so that the concentration of slurry may be kept at all times to be constant. Further, a clean liquid is supplied, under the control of a second flow control means, in accordance with the amount of driving liquid supplied to the slurry tank.

5 Claims, 2 Drawing Figures

APPARATUS FOR CONTINUOUSLY TRANSFERRING A SLURRY BY LIQUID PRESSURE

BACKGROUND OF THE INVENTION

The present invention relates to an apparatus for continuously transferring, mainly, a slurry consisting of water and particles of solid matter such as, for example, bauxite, coal, nickel, ore, etc.

An apparatus for continuous transfer of a slurry by liquid pressure comprising a plurality of parallel-arranged feed chambers, a low-pressure slurry pump for charging a slurry consisting of water and solid matter into these feed chambers, and a high-pressure driving liquid pump for discharging the slurry from the feed chambers into a transfer pipe, arranged such that the position of a float member allowed to float at the boundary between the slurry supplied to a lower portion of the interior of each feed chamber and the driving liquid supplied to an upper portion of the interior thereof is detected by means of a detector and, by the detection signal thus obtained, the change-over valves provided on the driving-liquid inlet/outlet pipes and slurry inlet/outlet pipes are opened and closed, whereby to continuously transfer the slurry by liquid pressure, is disclosed in, for example, U.S. Pat. No. 4,321,016 and accordingly is known.

In addition, in a hydrohoist used, for example, for transferring a slurry of bauxite or the like, the percentage in which the slurry residing under the float member is mixed into the driving liquid residing over the same is experimentally found to be as very low as 0.1% or less.

However, if a driving liquid containing a small amount of slurry is circulated for a long period of time, the amount of slurry in this driving liquid will continue to increase in amount until the driving liquid eventually is changed into a slurry whose concentration is equal to that of the original slurry. When this driving liquid is supplied to the high-pressure driving liquid pump, the sliding portions thereof become worn and thus become unable to resist any further use. Conventionally, in order to solve this problem, the entire driving liquid from the feed chambers is once returned to a slurry preparation tank, and the remainder, if any, is introduced into a precipitation tank in which the solid matter is precipitated. The driving liquid after being subjected to precipitation of the solid matter is again supplied into the driving liquid tank. Further, it is subjected to another use, for example, crushing the solid matter, or being applied to a wet mill.

That is to say, where the above-mentioned driving liquid is used by being returned to the slurry preparation tank, the above-mentioned precipitation tank is required and, particularly when the solid matter contained in the driving liquid consists of fine particles, a very large tank for precipitation is necessary. This means that the area required becomes large and the cost of the apparatus becomes correspondingly very high.

Further, where the above-mentioned driving liquid is used for said second purpose of, for example, crushing the solid matter, the amount thereof becomes greater than required, so that a filter means for cleaning this surplus becomes necessary. This means that a large amount of time and labor is required for, for example, maintenance of that filter means.

SUMMARY OF THE INVENTION

The object of the present invention is to provide an apparatus for continuous transfer of a slurry by liquid pressure which makes it possible mainly to largely reduce the manufacturing cost of the apparatus.

To attain the above object, the present invention is characteristically arranged such that a part of the driving liquid discharged from a discharge pipe for this driving liquid is supplied, under the control of a first flow control means, into a slurry tank in accordance with the amount of solid matter being supplied thereinto so that the slurry concentration may be kept at all times constant or uniform; and, in accordance with the amount of the driving liquid supplied into the slurry tank, a clean water is supplied into a driving liquid tank under the control of a second flow control means.

DETAILED DESCRIPTION OF THE PREFERRED EMBODIMENT

A vertical type hydrohoist embodying the present invention will now be described. The feed chambers which are used in an apparatus for continuous transfer of a slurry will first be explained in advance of describing the embodiment of the present invention.

Figure 1:
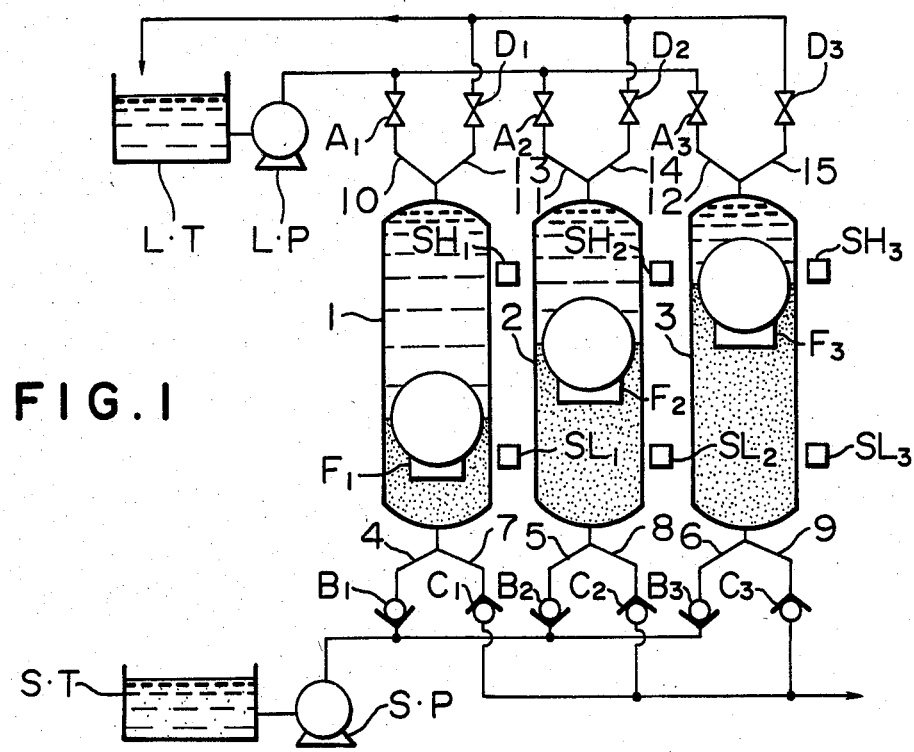
FIG. 1 is a schematic illustration for explaining the feed chambers used in an apparatus for continuous transfer of a slurry by liquid pressure; and, FIG. 2 shows a main part of the apparatus for continuous transfer of a slurry by liquid pressure according to the present invention.

Referring now to FIG. 1, there are provided feed chambers 1 to 3 used to temporarily store therein a slurry containing solid matter such as, for example, bauxite, coal, etc. Connected to the tops of these feed chambers are high-pressure driving liquid inlet pipes 10 to 12 for permitting a driving liquid (water or oil) having a specific gravity smaller than that of a slurry in a slurry tank ST to be supplied into the feed chambers 1 to 3 through change-over valves A1 to A3 by operation of a high pressure driving liquid pump LP, and discharge, or outlet, pipes 13 to 15 for permitting the driving liquid to return to the slurry tank ST through change-over valves D1 to D3.

Further, to the bottoms of the feed chambers 1 to 3 are connected slurry inlet pipes 4 to 6 for permitting the slurry in the slurry tank ST to be supplied into the feed chambers 1 to 3 through check valves B1 to B3 by operation of a slurry pump SP, and slurry discharge or outlet pipes 7 to 9 for permitting the slurry to be discharged into a transfer pipe through check valves C1 to C3. Within the feed chambers 1 to 3, float members F1 to F3 are inserted, which float members F1 to F3 have their buoyancy so chosen as to permit these members to be located at all times at the border between the slurry and the driving liquid. The border or boundary is shown in FIG. 1 between the stipled area and the dash lines in each of the chambers 1 to 3. For ease of illustration, a gap is shown between the surface of the float members and the inner walls of the chambers to better illustrate the movement of the floats in the chambers. However, in practical use, there will be a sliding contact between these surfaces. Outside the feed chambers 1 to 3, detectors SH1 to SH3 and SL1 to SL3 such as proximity switches are provided, which serve to detect the upper limit positions and the lower limit positions of the float members F1 to F3, respectively. The reference numeral 16 denotes a belt conveyor used to supply solid matter of, for example, bauxite, coal, etc. to the slurry tank ST.

Figure 2:
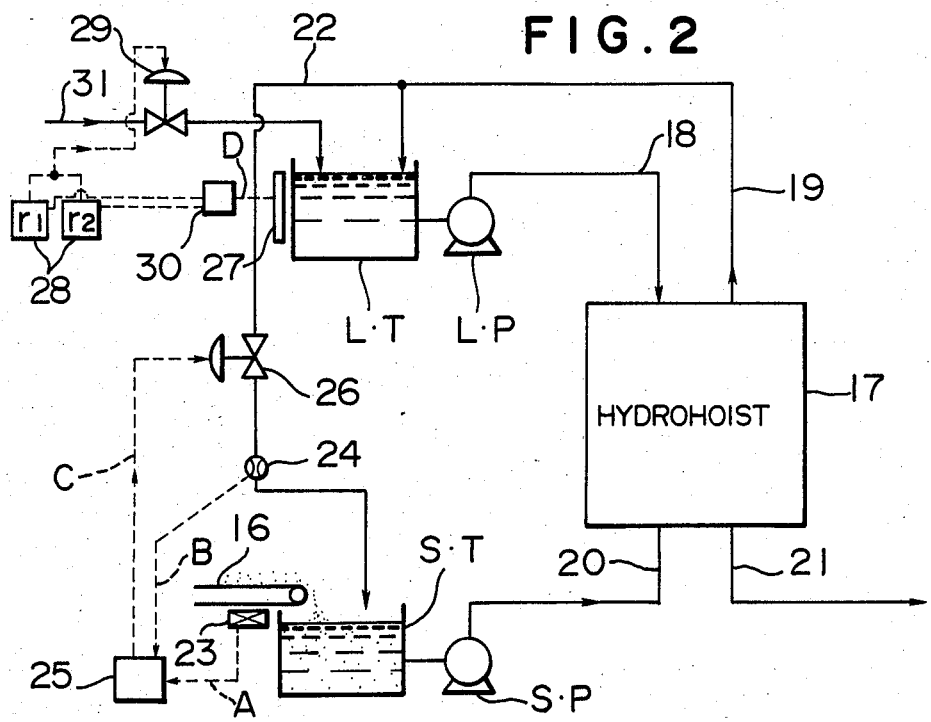

A main part of the apparatus for continuously transferring a slurry by liquid pressure according to the present invention will now be described with reference to FIG. 2.

The reference numeral 17 designates a hydrohoist comprising the above-mentioned feed chambers 1 to 3, which hydrohoist is connected, at its top side, with driving-liquid inlet and outlet pipes 18 and 19 and, at its bottom side, with slurry inlet and outlet pipes 20 and 21.

A part of the driving liquid discharged from the driving-liquid outlet pipe 19 into a driving liquid tank LT passes through a driving-liquid branching pipe 22, and is introduced into the slurry tank ST. The reference numeral 23 denotes an amount-of-solid-matter detecting means such as a belt scale which is intended to detect the amount of solid matter of, for example, bauxite supplied into the slurry tank ST by means of the belt conveyor 16. The reference numeral 24 denotes a flow detector which is intended to detect the flow rate of the driving liquid introduced into the slurry tank ST through the driving-liquid branching pipe 22. The reference numeral 25 denotes a first control means which serves to operate a first flow control valve 26 so as to make the slurry concentration in the slurry tank ST equal to a predetermined concentration set beforehand, i.e., in this way to control the flow rate of the driving liquid introduced into the slurry tank ST. This first control means 25 supplies a signal C indicating said predetermined set concentration to the first flow control valve 26 in accordance with the detection signals A and B sent from the flow detector 24 and the amount-of-solid-matter detecting means 23. The reference numeral 27 denotes a liquid level position detector such as, for example, a float switch which is intended to detect the liquid level position of the driving liquid tank LT. The reference numeral 28 denotes a ratio setting means comprised of a ratio-r1 setter and a ratio-r2 setter. The r1 (ratio) setter is set at a value causing the second flow control valve 29 to permit the flow of the clean liquid (water or oil) equal to 0.9 times the flow of the driving liquid detected by the first flow control valve 26 when the latter is assumed to be 1. Further, the r2 (ratio) setter is set at a value causing the second flow control valve 29 to permit the flow of the clean liquid equal to 1.1 times the flow of said driving liquid detected. The reference numeral 30 denotes a second control means which controls the ratio r1 or r2 setting means 28 in accordance with the signal D from the liquid level position detector 27 which indicates the liquid level position value in the driving liquid tank LT.

The slurry transfer operation of the hydrohoist will now be described with reference to FIG. 1 only in regard to one feed chamber.

Suppose that the feed chamber 1 is filled with a driving liquid; and the check valve C1 for slurry and the change-over valve A1 for the driving liquid pipe 10 are closed while the change-over valve D1 for the discharge or outlet pipe 13 is opened. When, under this condition, the slurry pump SP is operated or driven, the slurry from the slurry tank ST forcibly opens the change-over valve B1 for the slurry inlet pipe 4 to enter the feed chamber 1, thereby causing the driving liquid filled in the feed chamber 1 to be discharged therefrom through the change-over valve D1. For this reason, the boundary surface between the driving liquid and the slurry is caused to rise, whereby the float member F1 floating on said boundary surface is also caused to rise correspondingly. When the float member F1 rises to reach the upper part of the feed chamber 1, the position of the float member F1 thus raised is detected by the proximity switch or upper limit position detector SH1. The change-over valve D1 is closed in response to the signal supplied from this upper limit position detector SH1. When, next, the change-over valve A1 is opened (at this time, the driving liquid pump LP is kept in operation), the check valve B1 is closed by the liquid pressure and, at the same time, the check valve C1 is opened. For this reason, the driving liquid from the driving liquid pump LT pushes the slurry down. Accordingly, the boundary surface between the driving liquid and slurry is caused to fall and, at the same time, the float member F1 floating on that boundary surface is also caused to fall correspondingly. Thus, the slurry is supplied into the transfer pipe through the check valve C1. When the float member F1 arrives at the lower, or bottom, part of the feed chamber 1, the lower limit position detector, or proximity switch, SL1 detects the float member F1 thus lowered. In response to the signal supplied from that proximity switch SL1, the change-over valve A1 is closed. When, next, the change-over valve D1 is opened, the float member F1 is again caused to rise. If the foregoing operation is carried out in accordance with a time schedule in which the operation cycles of the three supply vessels 1 to 3 are sequentially delayed, then it is possible to effect a continuous transfer of slurry.

The operation of the present apparatus for continuously transferring a slurry by liquid pressure will now be described with reference to FIG. 2.

The driving liquid discharged from the feed chamber of the hydrohoist 17 is partly supplied into the driving liquid tank LT through the driving liquid discharge or outlet pipe 19 and the remainder is supplied into the slurry tank ST through the driving-liquid branching pipe 22, flow control valve 26, etc. On the other hand, the amount of the solid matter supplied to the slurry tank ST from the belt conveyor 16 is detected by the amount-of-solid-matter detector 23 and, at the same time, said remainder of the driving liquid is detected by the flow detector 24. In response to the detection signals thus obtained, the first control means 25 supplies to the flow control valve 26 a signal making the flow of the remainder driving liquid a value capable of maintaining the slurry concentration in the slurry tank ST at all times to have a predetermined set value. That is, the flow control valve 26 controls the flow of the driving liquid supplied to the slurry tank ST so as to permit the slurry concentration to be kept at the predetermined set concentration value.

Further, the level position of the driving liquid in the driving liquid tank LT is detected by the liquid level position detector 27 and the detection signal thus obtained is supplied to the second control means 30. This second control means 30 permits the liquid level position to be set at any given value and supplies to the ratio setting means 28 the signals corresponding to the upper and lower limits of a predetermined liquid level position set beforehand. That is to say, when the liquid level position is at the upper limit level, the ratio-r1 setter is allowed to operate. Further, when the liquid level position is located at the lower limit level, the ratio-r2 setter is allowed to operate.

Further, while the clean liquid supplied from a clean liquid supply pipe 31 into the driving liquid tank LT has its flow rate controlled by the flow control valve 29, this control is performed in accordance with the signal from the second control means 30. Namely, the signal from the control means 30 is supplied to the flow control valve 29 through the r1 setter or r2 setter of the ratio setting means 28. Which one of the r1 setter and r2 setter is selected is determined as follows. For example, when the liquid level position of the driving liquid in the driving liquid tank LT reaches the upper limit, it is detected by the liquid level position detector 27 and, at the same time, the detection signal is supplied to the ratio setting means 28 by the second control means 30. Thus, the ratio r1 setter of the ratio setting means 28 is selected by said detection signal, whereby the flow control valve 29 permits the supply into the driving liquid tank LT of the clean liquid equal to 0.9 times the flow of the driving liquid detected by the first flow control valve 26. On the other hand, when the liquid level position of the driving liquid in the driving liquid tank LT reaches the lower limit, the r2 setter of the ratio setting means 28 is selected by the signal from the second control means 30, whereby the flow control valve 29 permits the supply into the driving liquid tank LT of the clean liquid equal to 1.1 times the driving liquid.

Accordingly, even when the amount of the solid matter supplied from the belt conveyor 16 into the slurry tank ST is greatly varies, the liquid level position of the driving liquid tank LT is kept stable at all times to fall within the region between the upper and lower limits. Further, the operation is sufficiently possible with a small interval between the upper and lower limits of the liquid level position. This permits the use of a clean liquid tank, not shown, having a minimum size.

The reason why the above-mentioned ratio setting means 28 is constituted by the r1 and r2 setters is as follows. In principle, the liquid level position of the driving liquid tank LT must be kept constant if the clean liquid equal in quantity to the driving liquid detected by the flow detector 24 is supplied into the driving liquid tank LT. Practically, however, it is impossible, due to the errors made in the flow control valve, control means, etc. to make control so as to supply the same amount of clean liquid into the driving liquid tank LT. In the present invention, therefore, control is made of the amount of clean liquid by a previous setting to a predetermined ratio. Where the return liquid of the driving liquid is reused by being circulated as stated before, there occurs the problem that the slurry is mixed into the driving liquid through the float member inserted or put as a separator in the feed chamber (which separator, or the float member, is intended to prevent the slurry residing thereunder from being mixed into the driving liquid residing thereover).

In an actual example of measurement in the case of handling a slurry of bauxite, the amount of the solid matter mixed into the driving liquid was 0.064%. However, where, as in the present invention, the driving liquid is returned 50% to the driving liquid tank LT and is returned 50% to the slurry tank ST, since the clean liquid is after all supplied 50% into the driving liquid tank LT, the amount of the solid matter in the driving liquid tank LT is 0.032%. Therefore, the return liquid has no undesirable effect upon the operation of the driving liquid pump.

Accordingly, the precipitation tank or filter means which was conventionally required to be provided becomes unnecessary. Thus, the process steps involved are reduced and, at the same time, it is possible largely to reduce the cost for manufacturing the apparatus.

According to the present invention, a large tank for precipitation, or a filter means which necessitates maintenance in particular, becomes unnecessary. As a result, the cost can be decreased, and, at the same time, the process steps are reduced while the operation is correspondingly greatly simplified.

What is claimed is:

1. An apparatus for continuously transferring a slurry by liquid pressure comprising a slurry tank for storing therein a slurry containing solid matter, a plurality of feed chambers, each for temporarily storing therein said slurry from said slurry tank, and a driving liquid tank for storing therein a driving liquid having a specific gravity smaller than that of said slurry, arranged such that each said feed chamber is connected, at its bottom portion, with a slurry inlet pipe for supplying said slurry to said feed chamber and a slurry outlet pipe for delivering said slurry from said feed chamber, and, at its top portion with a driving-liquid inlet pipe for supplying said driving liquid to said feed chamber and a driving-liquid outlet pipe for discharging said driving liquid from said feed chamber; a float member being provided inside each said feed chamber, each said float member having its buoyancy chosen as to permit each said float member to be located at the boundary surface between said slurry and said driving liquid, and valves being provided on said inlet and outlet pipes, whereby the valves are opened and closed in accordance with the instructions supplied from detectors for detecting the position of each said float member, thereby continuously transferring said slurry in each said feed chamber by the liquid pressure, characterized in that a part of the driving liquid discharged from each said driving-liquid outlet pipe of each said feed chamber is supplied, under the control of a first flow control means, to said slurry tank in accordance with the amount of the solid matter supplied to said slurry tank; and a clean liquid is supplied, under the control of a second flow control means, to said driving liquid tank in accordance with the amount of the driving liquid supplied to said slurry tank.

2. An apparatus according to claim 1, wherein said first flow control means is constituted by a first detector for detecting the flow rate of said driving liquid supplied to said slurry tank, a second detector for detecting the amount of the solid matter supplied to said slurry tank, and a first flow control valve for controlling the flow rate of the driving liquid in accordance with the detection signals supplied thereto from said first and second detectors.

3. An apparatus according to claim 1, wherein said second flow control means is constituted by a first detector for detecting a liquid level position of said driving liquid tank, a controller for selecting, in accordance with the detection signal from said first detector, one of a plurality of ratio setting means which corresponds to said liquid level position, and a first flow control valve for controlling the flow rate of the clean liquid in accordance with the instruction signal supplied from said controller.

4. An apparatus according to claim 2, wherein said second detector for detecting the amount of solid matter is a belt scale.

5. An apparatus according to claim 3, wherein said first detector for detecting said liquid level position is a float switch.

* * * * *